2 Sheets—Sheet 1.
G. GOEWEY.
CORN SHELLER.
No 44,768.        Patented Oct. 18, 1864.
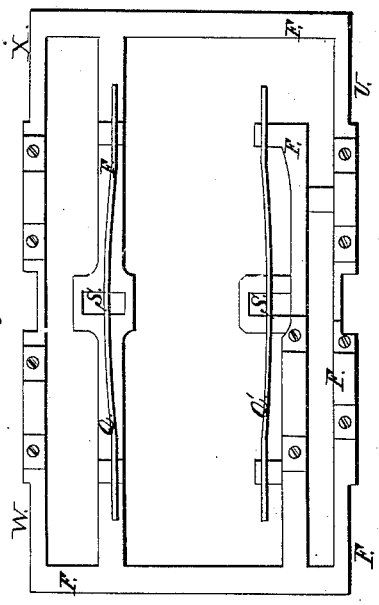
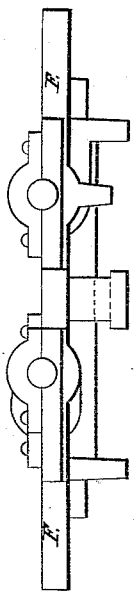
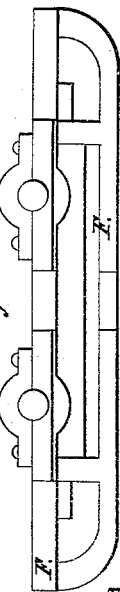
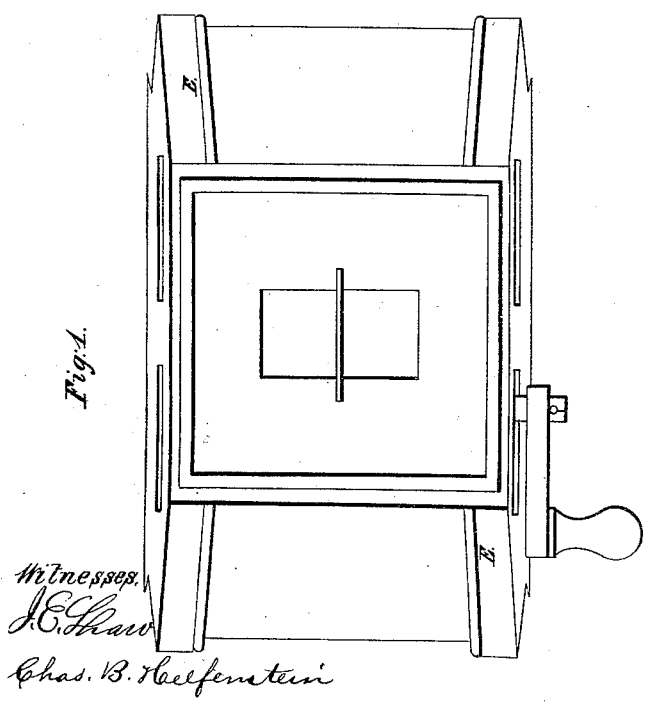
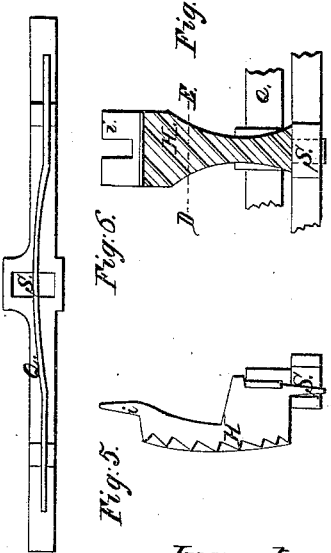
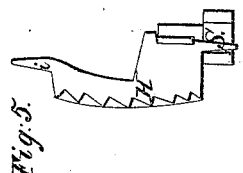
Witnesses
J. C. Shaw
Chas. B. Helfenstein
Inventor
George Goewey 2 Sheets—Sheet 2.
G. GOEWEY.
CORN SHELLER.
No 44,768.  Patented Oct. 18, 1864.
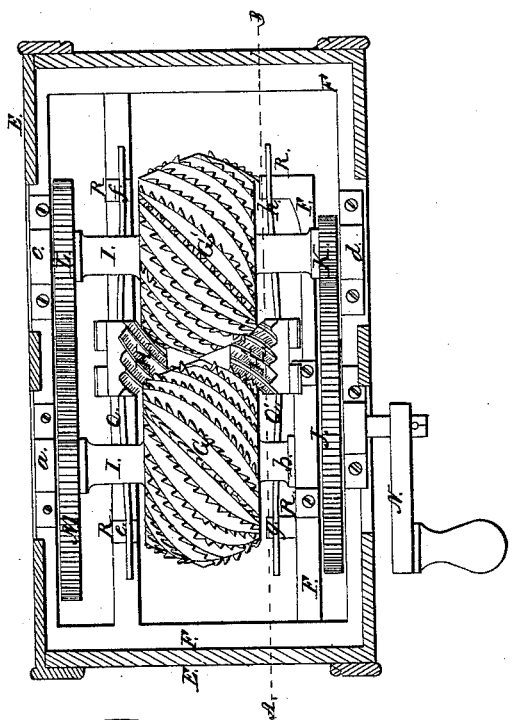
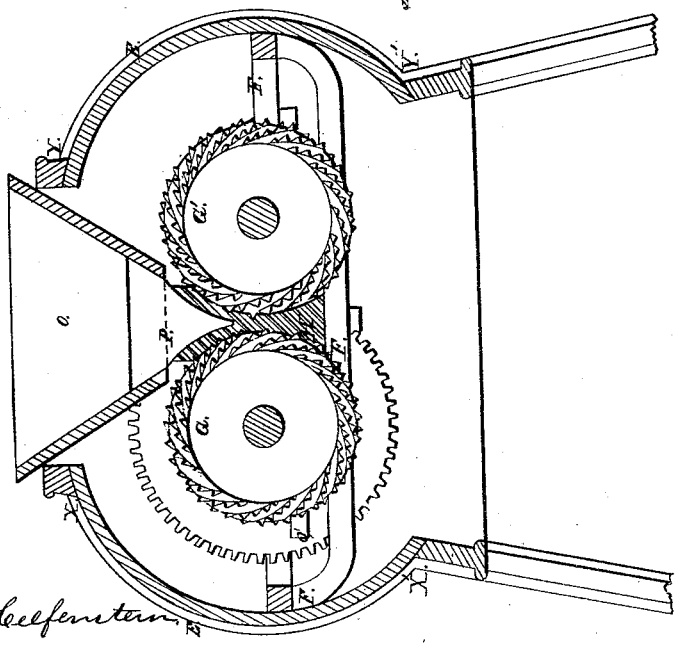
Witnesses
J. E. Shaw
Chas. B. Helfenstein
Inventor
George Goewey

UNITED STATES PATENT OFFICE.

GEORGE GOEWEY, OF PHILADELPHIA, PENNSYLVANIA, ASSIGNOR TO HIMSELF AND WILLIAM BAILEY.

IMPROVEMENT IN CORN-SHELLERS.

Specification forming part of Letters Patent No. 44,768, dated October 18, 1864.

*To all whom it may concern:*

Be it known that I, GEORGE GOEWEY, of the city of Philadelphia and State of Pennsylvania, have invented certain new and useful Improvements in Corn-Shellers, (for which Letters Patent of the United States were granted to me and WILLIAM BAILEY, as assignees of myself, on the 10th of February, 1863;) and I do hereby declare that the following is a full, clear, and exact description of the construction and operation of the same, reference being had to the annexed drawings, making a part of this specification, in which—

Figure 1 is a top view of the machine, the hopper and a portion of the outer frame being cut away; Fig. 2, a horizontal section; Fig. 3, a vertical section on the line A B of Fig. 2; Fig. 4, a top view of one of the springs and of a portion of the inner frame; Fig. 5, a side view of the concave; Fig. 6, a front view, showing also the mode of applying the spring thereto; Fig. 7, a section of the concave on the line C D of Fig. 6. Fig. 8 is a top view of the inner frame and the springs. Fig. 9 is a side view of the side T U, Fig. 8, of the inner frame. Fig. 10 is a similar view of the side W X, Fig. 8, of the inner frame.

The drawings are on a scale of about one to four.

E, Figs. 1, 2, and 3, is the outer frame of the machine.

F, Figs. 2, 3, 8, 9, 10, is the inner frame, which gives support to the several working parts of the machine.

G G' are the shelling-rollers, each formed by uniting the frusta of two cones at their bases. They are provided with teeth set in diagonal lines.

H H', Figs. 2, 3, 5, 6, and 7, are two parts, which I denominate "yielding concaves." They are alike in form. Measured from top to bottom they are convex on their faces. Measured from one side to the other on their faces they are concave. They have ridges or teeth set diagonally, as shown, so as to correspond or be in a line with the rows of teeth on the shelling-rollers.

I I' are the roller shafts, which rest at their ends on the inner frame, the one at $a$ and $b$, the other at $c$ and $d$, as shown in Fig. 2.

J is the driving-wheel, geared into the pinion K, which is on one end of the shaft I'.

L is a cog-wheel on the other end of the same shaft, and geared into the larger cog-wheel M, on one end of the shaft I.

Power is applied to the driving-wheel J by means of the crank N, and the gearing described causes the roller G' to turn with about twice the speed with which the roller G turns.

O, Fig. 3, is the hopper. It is divided at the bottom, as shown, by a low partition, P, extending down to a point or edge between the apexes of the rollers.

Q Q' are two flat steel springs, each of which rests loosely in slots, the one in $e$ and $f$, the other in $g$ and $h$, in upright lugs R, forming part of the inner frame.

One end of each of the concaves H H' rests in a seat in the inner frame, as at S in Figs. 4, 5, 6. The upper ends, $i$, of the concaves bear against the hopper O. The springs Q Q', pressing against the lower parts of the concaves, hold them in an upright position and permit them to yield to pressure backward.

The described mode of arranging the springs allows the upper ends of the concaves to yield more freely than the lower ends. They thus facilitate the admission of the ears of corn.

The outer frame and the hopper might be made of wood, but I prefer to make the machine throughout of cast-iron. The inner frame is cast in a single piece. The ends X X' and Y Y', Fig. 3, of the outer frame are each cast in a single piece. The two sides are also cast separately. The rollers I cast hollow in two parts, the dividing line being at the apex of each roller. The two parts, when placed together on the shaft, form the roller shaped as shown. The sides are slotted longitudinally, so that when the working parts are in place in their bearings in the inner frame, and the sides are applied, projecting parts of the inner frame rest in the last-mentioned slots, as is shown in Fig. 2.

The drawings represent a double machine. In single machines I employ but one concave and the accompanying spring, and make the rollers each of the shape of a single frustum.

Having thus described my invention, what I claim, and desire to secure by Letters Patent, is—

The arrangement and combination of the inner frame, F, with one or more yielding concaves, H, a spring or springs, Q, and the rollers G, in the manner and for the purpose substantially as described.

GEORGE GOEWEY.

Witnesses:
CHAS. B. HELFENSTEIN,
JAMES McCALEM.